H. C. GUTTRIDGE.
HORSE COLLAR.
APPLICATION FILED OCT. 24, 1913.
1,159,666.
Patented Nov. 9, 1915.
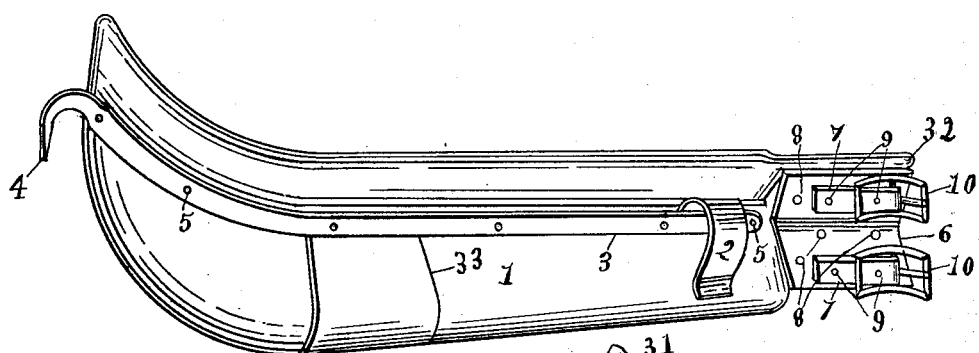
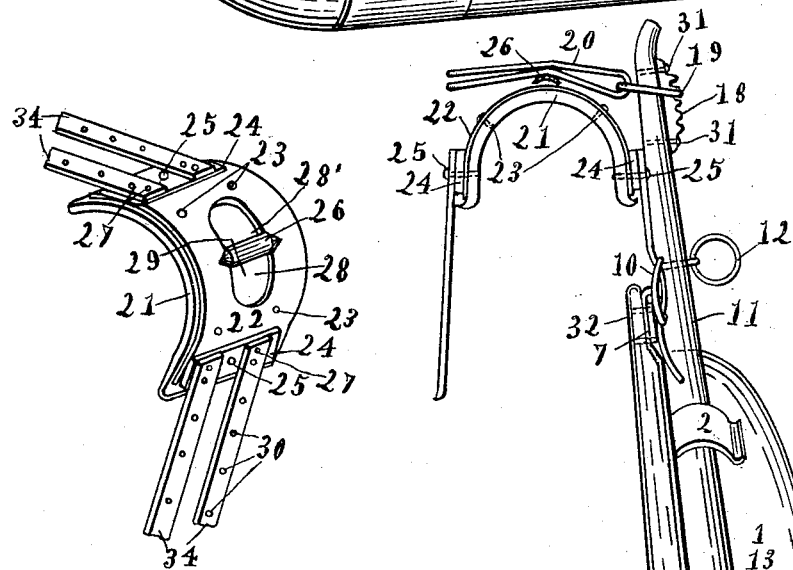
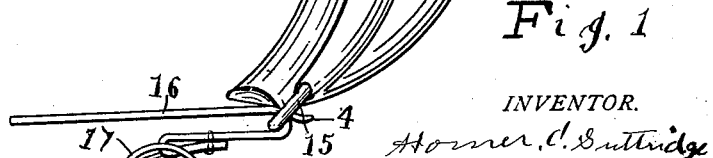

UNITED STATES PATENT OFFICE.

HOMER C. GUTTRIDGE, OF CULLISON, KANSAS.

HORSE-COLLAR.

1,159,666.   Specification of Letters Patent.   Patented Nov. 9, 1915.

Application filed October 24, 1913.   Serial No. 797,050.

*To all whom it may concern:*

Be it known that I, HOMER C. GUTTRIDGE, a resident of Cullison, in the county of Pratt and State of Kansas, have invented certain new and useful Improvements in Horse-Collars; and I do hereby declare the following to be a full, clear, and exact description of the invention, such as will enable others skilled in the art to which it appertains to make and use the same.

My invention relates to horse collars and has for its objects: 1st, the production of a collar that is cheap, practical and durable; 2nd, a collar that is readily adjusted; 3d, a collar that will prevent abrasion of the animal's neck; 4th, a collar pad that will yield under presusre to fit the horse's neck; 5th, a pad that can be used on sore necks and eliminate the pressure from the afflicted part; 6th, to provide a collar of which the shoulder-bearing members are free to act with each movement of the horse's shoulder; 7th, a further object is to provide a pad pivotally connected at its free ends, whereby it will be given a rocking movement.

Further objects and advantages will be more fully set forth in the specifications, illustrated in the accompanying drawings, and succinctly defined in the appended claims.

Referring to the drawings: Figure 1 is an elevation of a portion of my collar. Fig. 2, a view of the shoulder-bearing members. Fig. 3, a perspective view of the pad.

In the drawing, 1 designates one of the shoulder bearing members of which there are two, being right and left and are, when in use, independent of each other. I have shown only one of said members, they being both exactly alike and a description of one will suffice for both. These members have affixed thereto by rivets 5—5 a metallic reinforcing strip having a hook 4 on its lower end and integral with the top end, extending from the edge thereof, a curved keeper 2, which is for the purpose of clasping the hame as seen in Fig. 1, and holding it in proper relation. The link 15 is placed on the hook 4 and the hame-strap 16 is placed in said link and is passed through the opposite hame link (not shown) and is brought back and secured in the buckle 17. It is obvious with this construction and organization, the shoulder-bearing members are free to act with each movement of the horse's shoulders. In the construction of these members I make them to extend about two thirds up the shoulder and with a reduced extension 32 to which is affixed by rivets 8—8 a thick piece of leather 6, and strips of leather 7, carrying buckles, are affixed to the aforesaid member 6 by rivets 9—9.

In the aforesaid hame is a line-ring 12 and near the top end of the hame is a toothed member 18, secured to said hame with rivets or screws 31—31. Said member is for the reception of a link 19 through which passes the usual hame strap 20. The said link is adjustable on the toothed member 18. It is to be noted that the hame strap can be raised up out of contact with the neck-pad 21 which eliminates from the pad the lateral movement of the hames, due to the movement of the horse's shoulders and allow the said pad to rest steady upon the neck. In the hame is the usual staple 13 to which is attached the trace 14.

I will describe the construction and organization of my improved neck-pad, as shown in Fig. 3. I provide a leather pad 21 to which is affixed by rivets 23—23 a metallic saddle 22. An elongated opening 28′ is made in the leather pad and in the metallic saddle is a similar opening 28, having transversely thereover a bridge 26, which can be pressed into form as shown when the saddle is formed. One of the features of this bridge is its lower side being somewhat raised above the plane of the saddle as shown in a sectional view, Fig. 1, taken on the line 29 of Fig. 3. With this construction it is apparent if the animal was afflicted with a sore neck, the pressure could be kept off by the use of my neck-pad. Rectangular metallic plates 24—24 are pivotally affixed to the free ends of the said pad with rivets 25—25 and to said plates are affixed with rivets 27—27 leather straps 34—34 which are connected to the buckles 10—10 and have therein a series of buckle-holes 30—30. When the neck-pad and the shoulder bearing members are connected together as shown on Fig. 1, and the hame strap 20 is raised, if desired, to clear the bridge 26, it is obvious the lateral movement of the harness due to the action of the horse's shoulders will not affect the neck-pad and said pad being pivoted as at 25, will allow the said neck-pad a rocking movement.

A great many other minor changes, modifications and alterations may be made in the construction of my device without departing from the protection prayed.

What I claim is:

1. In a combined collar and hames, shoulder bearing members, buckles affixed thereto, a metallic reinforcing strip rigidly affixed to said members, a hook and hame-clasping member integral with said strip, a hame associated with said hook and clasping member, means for holding the tops of the hames in proper position, and a neck-pad adjustably connected to the shoulder bearing members.

2. In a combined collar and hames, shoulder bearing members, buckles affixed thereto, a metallic reinforcing strip rigidly affixed to said members, a hook and hame-clasping member integral with said strip, a hame associated with said hook and clasping member, means for holding the tops of the hames in proper position, and a pad having pivotally affixed thereto means for adjustably connecting said pad to the shoulder bearing members.

In testimony whereof, I have signed this specification in the presence of two subscribing witnesses.

HOMER C. GUTTRIDGE.

Witnesses:
E. E. BEARCH,
O. H. BOCK.

Copies of this patent may be obtained for five cents each, by addressing the "Commissioner of Patents, Washington, D. C."